US012688098B2

(12) United States Patent
Zhao et al.

(10) Patent No.: US 12,688,098 B2
(45) Date of Patent: Jul. 21, 2026

(54) SYSTEM AND METHOD OF DRAINLESS LINK REPAIR FOR INCREASED ACCELERATOR UTILIZATION DURING FAILURE

(71) Applicant: Google LLC, Mountain View, CA (US)

(72) Inventors: Wenbo Zhao, Sunnyvale, CA (US); Dayou Du, San Jose, CA (US); Alireza Ghaffarkhah, San Jose, CA (US); Pasha Heifetz Stone, San Francisco, CA (US); Brennan Waichi Swanton, Santa Clara, CA (US); Ming Xia, Fremont, CA (US); Kun Li, Sunnyvale, CA (US); Mohamed Abdelhafez, Sunnyvale, CA (US); Yuanjie Sun, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/762,088

(22) Filed: Jul. 2, 2024

(65) Prior Publication Data

US 2026/0010442 A1     Jan. 8, 2026

(51) Int. Cl.
    *G06F 11/16* (2006.01)
(52) U.S. Cl.
    CPC .... *G06F 11/1616* (2013.01); *G06F 2201/805* (2013.01)
(58) Field of Classification Search
    CPC ...................... G06F 11/1616; G06F 2201/805
    See application file for complete search history.

(56) References Cited

U.S. PATENT DOCUMENTS

| | | | | |
|---|---|---|---|---|
| 6,718,486 | B1 * | 4/2004 | Roselli | G06F 11/1438 |
| | | | | 714/41 |
| 7,685,269 | B1 * | 3/2010 | Thrasher | H04L 43/00 |
| | | | | 709/224 |
| 8,145,894 | B1 | 3/2012 | Casselman | |
| 9,483,291 | B1 * | 11/2016 | Chen | G06F 9/45533 |

(Continued)

OTHER PUBLICATIONS

Partial European Search Report for European Patent Application No. 25186839.4 dated Jan. 28, 2026. 17 pages.

*Primary Examiner* — Bryce P Bonzo
*Assistant Examiner* — Audrey Emma Whitesell
(74) *Attorney, Agent, or Firm* — Lerner David LLP

(57) ABSTRACT

A system for repair of an accelerator architecture including a plurality of accelerator host having a plurality of accelerator elements in each host and high-speed interconnects between accelerator elements and including a link health monitor service in the host determining a status of each interconnect internal and external to the host. The link health monitor service detects link status of the interconnects and communicates this to a pod manager responsible for managing a number of interconnected hosts. The pod manager communicates with a scheduler for scheduling processing tasks to each accelerator element or group of elements. Upon detection of an interconnect problem, the pod manager flags a least common ancestor in a binary tree of elements containing elements adjacent to the failed interconnect and flags the ancestor and its parent nodes as unavailable. Pod manager further generates a corrective action repairing the problem interconnect communicating the action to a technician.

19 Claims, 8 Drawing Sheets

(56)                    References Cited

U.S. PATENT DOCUMENTS

|  |  |  |  |
|---|---|---|---|
| 9,983,938 | B2 | 5/2018 | Heil et al. |
| 10,027,543 | B2 | 7/2018 | Lanka et al. |
| 10,216,555 | B2 | 2/2019 | Chiou et al. |
| 10,977,104 | B2 | 4/2021 | Chiou et al. |
| 2014/0149783 | A1* | 5/2014 | Georgiev ............ G06F 11/0793 |
|  |  |  | 714/4.2 |
| 2016/0306700 | A1 | 10/2016 | Heil et al. |
| 2019/0065290 | A1* | 2/2019 | Custodio ................ G06F 9/544 |
| 2023/0168919 | A1 | 6/2023 | Zhu et al. |

* cited by examiner

SYSTEM AND METHOD OF DRAINLESS LINK REPAIR FOR INCREASED ACCELERATOR UTILIZATION DURING FAILURE

BACKGROUND

Systems for providing acceleration services across a network include multiple host machines that can be connected through high-speed interconnects. When an interconnect fails, communication across the interconnect cannot occur and the accelerator elements relying on the failed connector must be removed from service. This requires the draining of a host machine connected to the interconnect, which causes a substantial degradation of utilization and service across the accelerator architecture.

BRIEF SUMMARY

The disclosed technologies provide for repairs in an accelerator architecture comprising a plurality of accelerator host machines. Each host includes multiple accelerator elements or chips which are connected to one another via high-speed interconnects. A link health monitor in each host detects and reports failures or problems in an interconnect associated with that host. A group of hosts or accelerator elements are organized as a pod, and a pod manager is associated with the pod. The link health monitor communicates the link states of that host to the pod manager. When an interconnect failure is detected, the pod manager locates the lowest slice in a hierarchical tree that contains elements connected to the failed interconnect. The pod manager reports the slice and parent nodes containing the affected slice to the scheduler to disable communication with the affected slices.

An automatic repair process analyzes the failure and generates a corrective action to repair the failure. The corrective action is provided to a technician to perform the repair. After completion of the repair, the system validates the repair was successful. Upon successful completion of the repair, the pod manager reactivates the affected slices and notifies the scheduler to begin utilizing the repaired slices.

Firmware enhancements provide the ability to hot plug interconnects in a host without shutting down the host and allowing the host to continue operating on components not affected by the interconnect being inserted or removed.

DETAILED DESCRIPTION

In conventional accelerator networks, failure of a communication interconnect requires the draining of a host machine connected to the affected interconnect. Draining requires all accelerator chips housed by the host to be marked as unavailable and all processing tasks assigned to the host or any of its components must be reversed and rescheduled. Draining a host machine substantially affects the availability of accelerator resources and the ability of the system to provide acceleration services.

Aspects of this disclosure enable the detection and repair of link problems in an accelerator architecture.

Accelerator workloads such as Large Language Models (LLMs) can run on an assembly of systems connected by high-speed interconnects or "links," forming a mesh, torus, or other configuration. Increasing bandwidth or size of the aggregate system requires a higher number of links. Physical links become a common hardware failure point as cabling can be dislodged, poorly mated, or even inadvertently disconnected during service. Once a link is disconnected, the system may be deemed to be in a "faulty" state and all running workloads are removed ("drained"). Until the repair is initiated (potentially days later), the accelerator equipment is stranded and unusable, sidelining extremely expensive hardware and reducing capacity of the Google fleet.

The described technology designs a system that handles link failures in a way that enables formerly stranded machine learning (ML) accelerator capacity to continue executing even while the repair is ongoing. This increases overall utilization of the hardware and gives the network operator higher capacity during failures.

Figure 1:
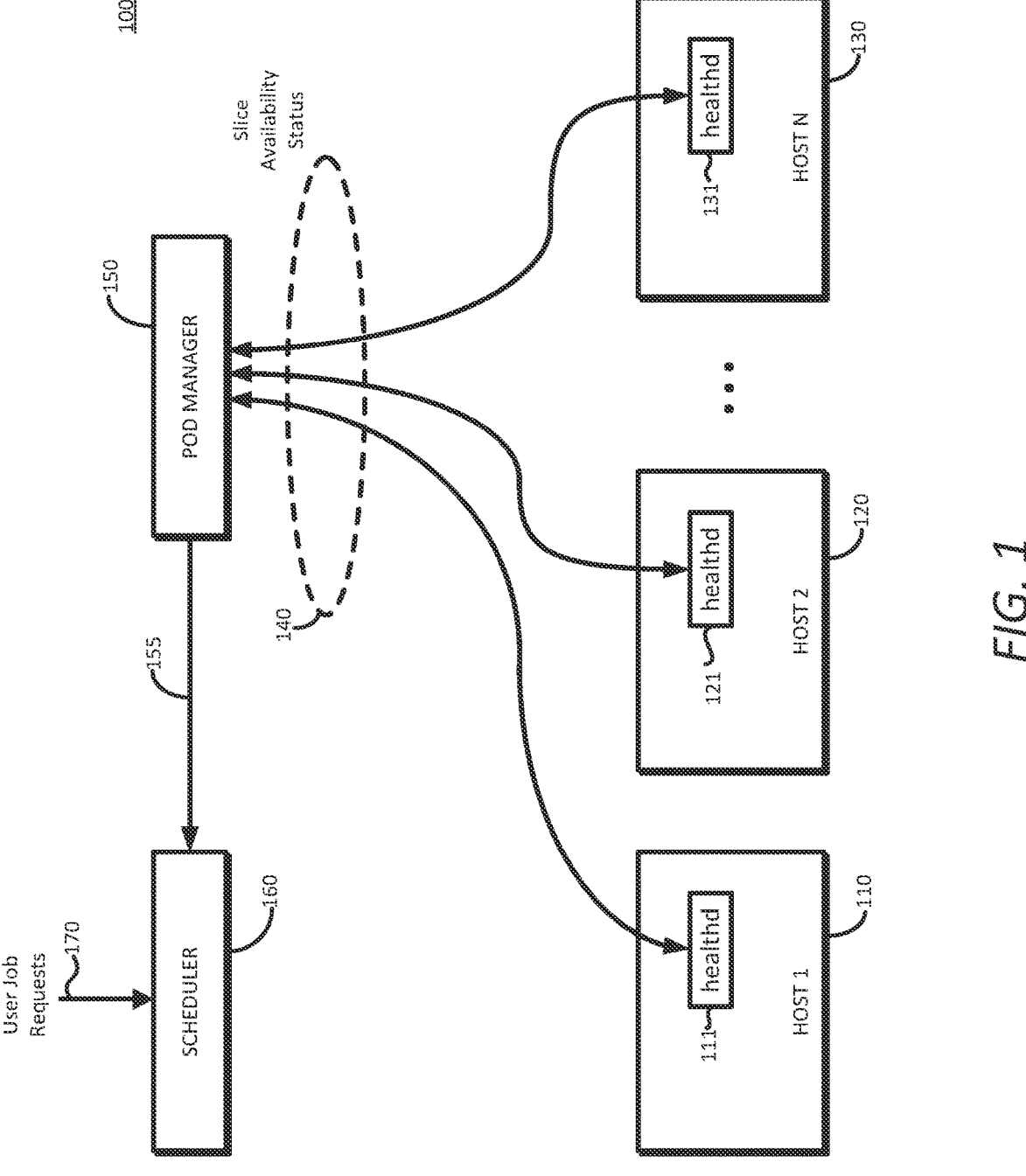
FIG. 1 is a block diagram of an accelerator system according to aspects of this disclosure.

FIG. 1 is a block diagram of an accelerator system 100 according to aspects of this disclosure. The accelerator system 100 may include a group of accelerator hosts, 110, 120, 130. Each host 110, 120, 130 can house a number of accelerator elements, which may be in the form of accelerator chips that receive processing tasks and perform processing as part of the overall accelerator system 100. A group of N hosts may be arranged in a group known as a pod. A pod manager 150 is associated with a defined pod of hosts and manages the distributed execution of workflows across the pod. The accelerator elements within hosts 110, 120, 130 communicate between each other internally within a given host or externally across hosts via interconnects or links. A service runs on the host as a daemon "healthd" 111, 121, 131 that monitors the health of links associated with a corresponding host 110, 120, 130, respectively. The link health monitoring service healthd 111, 121, 131 regularly communicates the state of the links in the pod 140 on a regular basis to pod manager 150. Based on the link health status 140, the pod manager 150 analyzes the state of the links and can update the availability of slices when a problem is detected. The updated slice status 155 is communicated to the scheduler 160 by the pod manager 150. User job requests 170 are presented to the scheduler and processing tasks defined by the request are assigned to slices in the hosts 110, 120, 130 based on slice availability. Pod manager 150 can identify links exhibiting problems and deactivate slices that are directly affected by the problematic links. Additionally, pod manager 150 can perform automatic detection and diagnosis of link problems. Pod manager may automatically generate corrective actions 150 that are communicated to a technician to perform the repair. According to the disclosed technology of this disclosure, repairs to interconnects associated with a host may be performed without draining or shutting down the entire host and only affects the accelerator elements that are directly affected by the compromised link. Accordingly, the function of the accelerator system 100 is improved by maintaining the maximum availability of processing resources in the system 100 and preserving pending tasks in elements that would be disabled by draining a host using conventional troubleshooting techniques.

Figure 2:
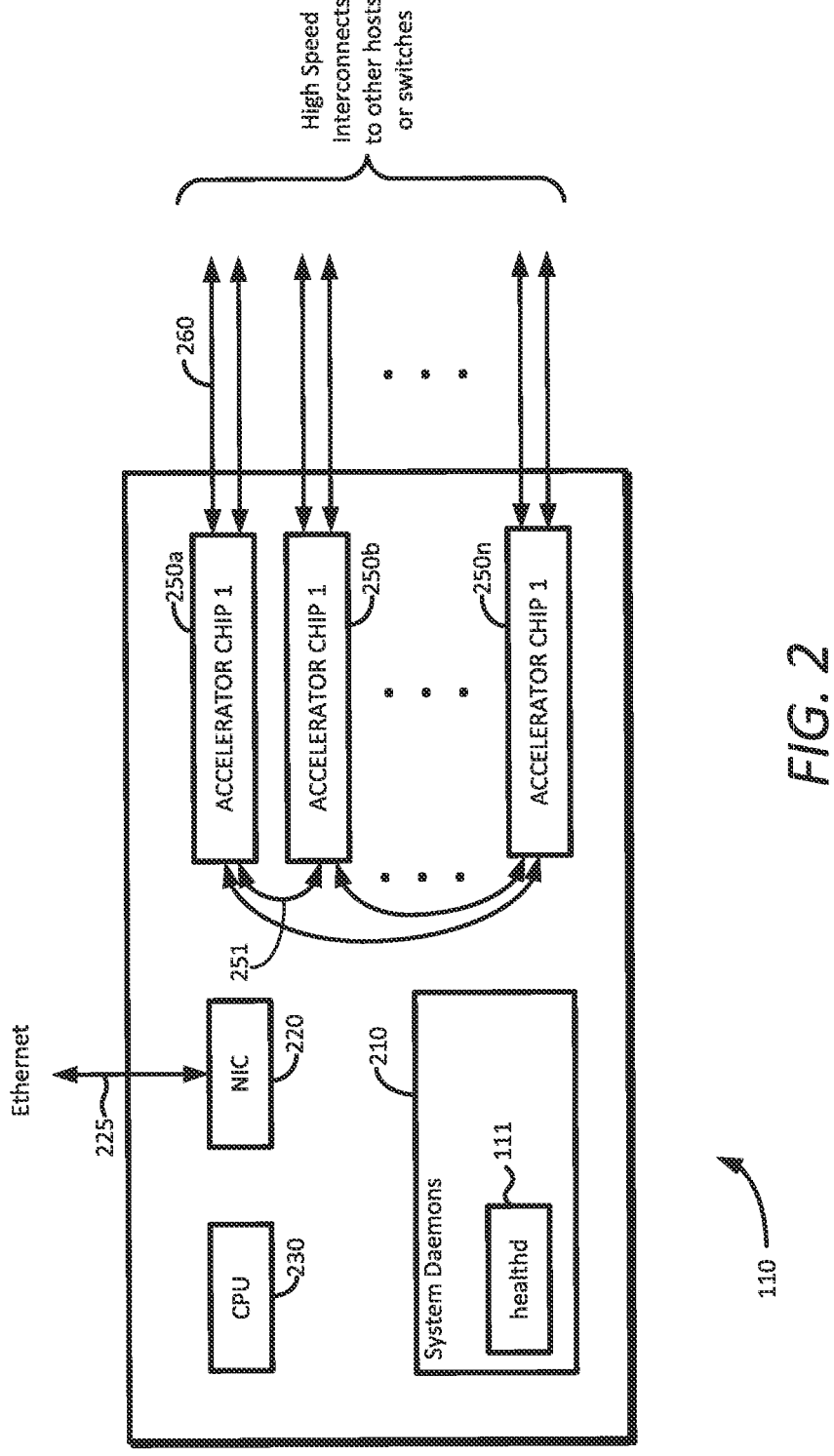
FIG. 2 is a block diagram of an accelerator host according to aspects of this disclosure.

FIG. 2 shows a simplified architecture of a host, such as host 110 shown in FIG. 1. The host 110 contains N accelerator chips 250*a*-250*n* that are interconnected to each other 251 and/or connected to remote chips through high-speed interconnects 260 by direct connection between hosts, or indirect connection over switches. Other network traffic 225, such as control plane traffic and non-accelerator user traffic, transmit through network interface connectors (NICs) 220 on the host 110. A system daemon 210 named "healthd" 111 continuously monitors healthiness telemetry of the links and detects potential failures.

A group of such hosts 110 can form a large-scale distributed system, referred to as a "pod" with hundreds to thousands of interconnected chips 250. A group of adjacent chips form a schedulable unit called a "slice." A centralized controller named the "pod Manager" regularly collects health information from healthd 111 on each host, aggregates the health information into slice availability information. A scheduler is populated with the slice availability as a hint for ML job scheduling. Scheduler accepts user job requests and allocates slices for each job, based on this predetermined slice availability.

Figure 3:
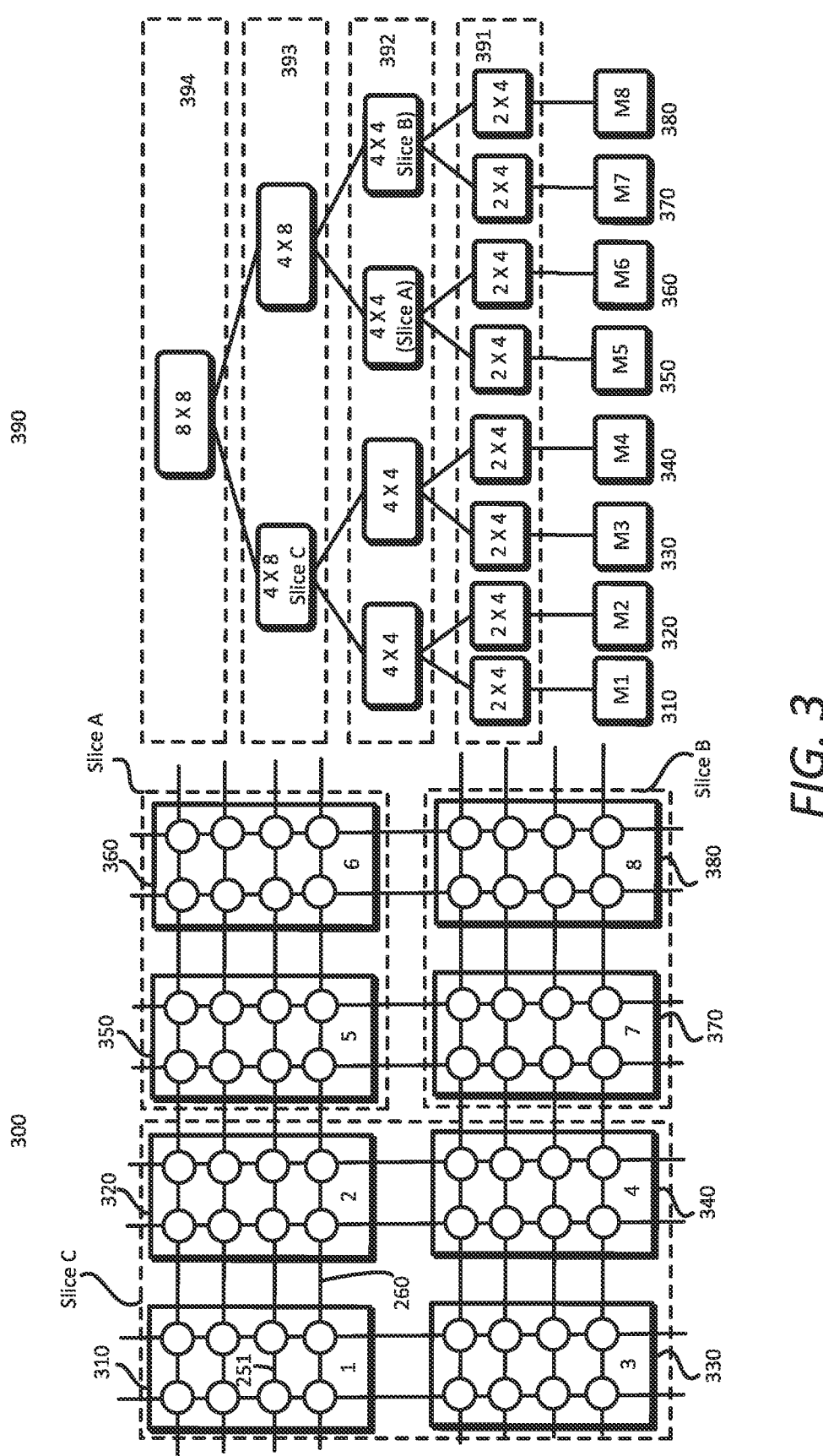
FIG. 3 is an illustration of an accelerator system arranged in slices and a corresponding hierarchical tree of slices according to aspects of this disclosure.

FIG. 3 is an illustration of an accelerator system 300 and its associated slice hierarchy 390 according to aspects of the disclosure. On the left accelerator system 300 is a group of chips forming an 8×8 2D mesh. The mesh includes 8 host machines 310-380. Each host contains a 2×4 grid of accelerator components (chips). The accelerator chips are interconnected with each other through internal interconnects 251, while accelerator elements in separate host machines 310-380 are interconnected by external interconnects 260. On the right 390 is the logical slice hierarchy tree representative of the mesh. Slice A, B, and C are examples of schedulable slices. Host 350 and host 360 and their associated accelerator elements define Slice A while host 370 and host 380 and their associated accelerator elements define Slice B. Accordingly, Slice A and Slice B define slices having a 4×4 array of accelerator elements. Slice C includes host 310, host 320, host 330 and host 340 and their associated accelerator elements. Slice C thereby defines a slice with a 4×8 array of accelerator elements.

A group of adjacent accelerator chips that operate as a schedulable unit is referred to as a slice. A slice can be defined by one chip or multiple chips. One slice can contain thousands of accelerator chips working as a unit. To improve scheduling efficiency and minimize fragmentation, a set of allowable slice sizes are pre-defined to a certain level 391, 392, 393, 394 as a static slice. Chips are pre-partitioned at each level, and typically each level has twice the number of chips as the previous level. Therefore, a hierarchy of static slices forms a complete binary tree 390 as shown in FIG. 3. The binary tree 390 visualizes that the 4×8 slice C is associated with the host machines 310, 320, 330, 340.

Figure 4:
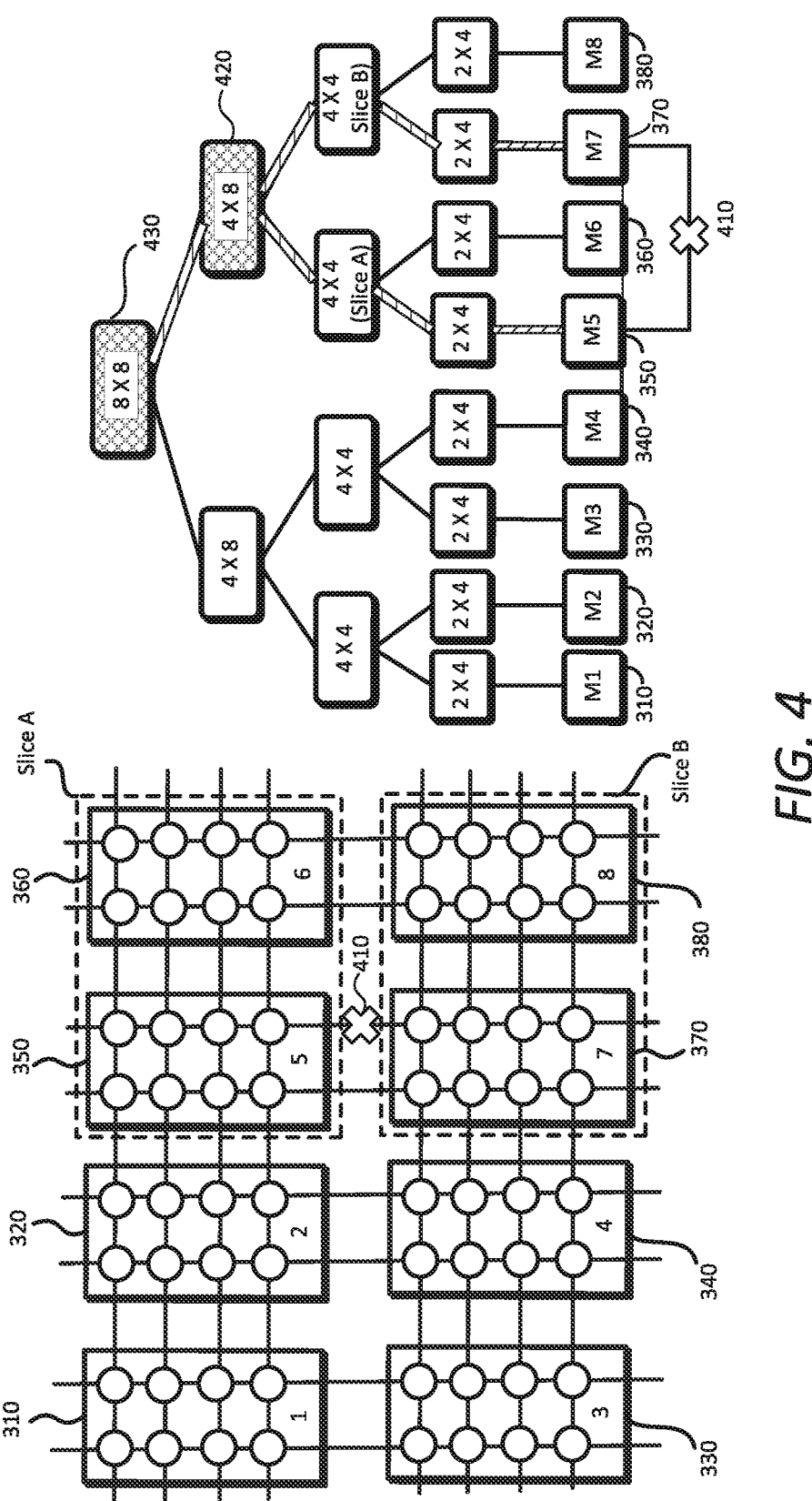
FIG. 4 is an illustration of a fault in an interconnect in the system of FIG. 3 according to aspects of this disclosure.

FIG. 4 is an illustration of identifying a failure in a link in an accelerator system. A link failure 410 is detected in the external interconnect that connects a first host machine 350 and a second host machine 370. The healthd daemon in first host machine 350 and/or the healthd daemon in second host machine 370 may detect the link failure 410 and provide the information to the pod manager. In the binary tree 390, the link failure 410 is traced through the binary tree 390 from first host machine 350 and second host machine 370 up the levels of the tree until the first slice containing both affected machines is found. In this case it is the 4×8 slice 420. The slice 420 will be flagged as affected and all scheduled tasks marked for this slice will be discontinued until the link is fixed. Referring back to binary tree 390, the parent node of node 420 is the 8×8 slice 430, which is also affected, and will be flagged as unavailable due to the link failure 410.

It should be noted that other processing being performed by first host machine 350 and second host machine 370 may continue if that process is not dependent on the failed link 410. For example, Slices A and B may continue to function normally because all links between host machine 360 and host machine 350 (Slice A) are functioning normally. Similarly for Slice B, all interconnects between host machine 370 and host machine 380 are functional and unaffected by link failure 410. By preventing the draining the entire host machines affected as in conventional techniques, the processing operations of the accelerator network are improved by keeping the number of affected slices so to a minimum.

Figure 5:
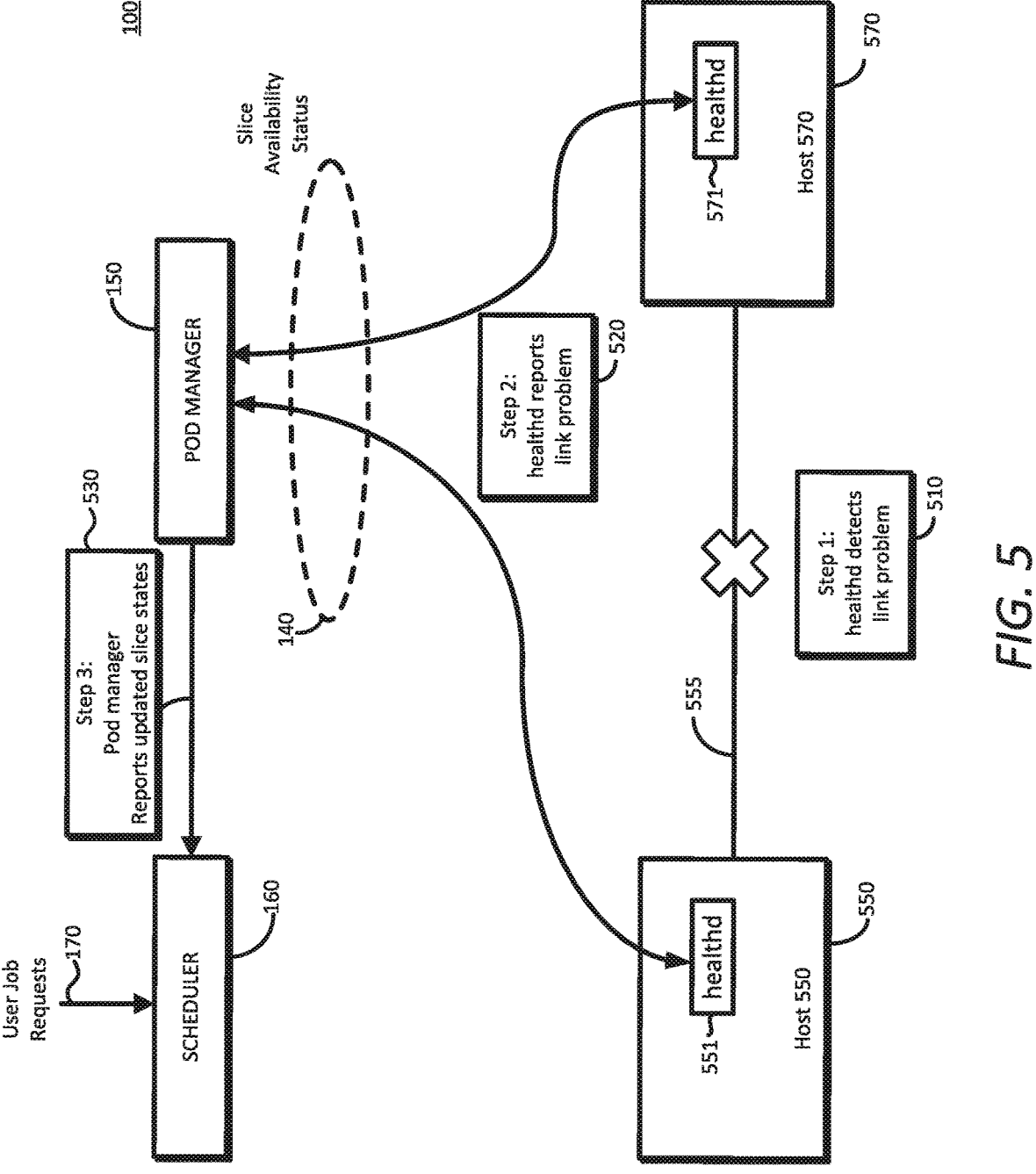
FIG. 5 is an illustration of detection and reaction to a link failure in an accelerator system according to aspects of this disclosure.

FIG. 5 is an illustration of the events associated with detection of the link failure illustrated in FIG. 4 in an accelerator system according to aspects of the disclosure. Host 550 and Host 570 are connected by interconnect 555. Host 550 includes healthd service 551 and Host 570 includes healthd service 571 which monitor the health of the links of each host. Either or both healthd service 551, 571 detects a link problem 510 affecting interconnect 555. Next, the healthd service 551, 571 reports 510 the detected link problem to the pod manager 150. healthd service for each host in the pod reports the link status for all hosts 140 to the pod manager including the reporting of the detected link failure 520. The pod manager 150 updates the scheduler 160 with the new slice availability information 530, including any slices that are flagged as inactive due to the detected link failure 510. Scheduler 160 will prevent user job requests 170 from processing on any flagged slices and will reschedule any processes that were in process but not completed when the link failure was detected.

Figure 6:
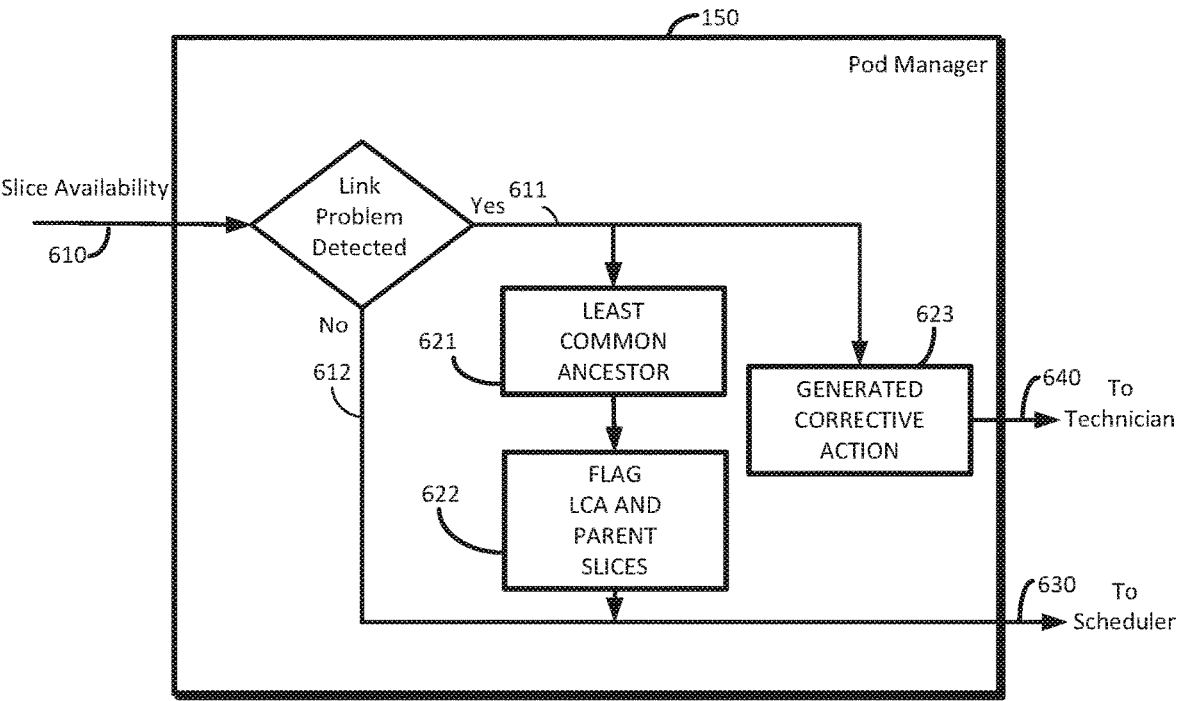
FIG. 6 is a flow diagram for a drainless link repair according to aspects of this disclosure.

FIG. 6 is a flow diagram illustrating drainless link repair according to aspects of this disclosure. The pod manager 150 receives slice availability information 610 from the healthd link health monitoring service in the hosts that define the pod. If the slice availability information 610 indicates that a link problem is detected 612 the pod manager 150 evaluates a least common ancestor algorithm (LCA) 621 to identify the common slice (node) in the binary tree of FIG. 3 which contains slices directly contacting the failed link. The pod manager 150 flags the least common ancestor and its parent slices as unavailable 622. The updated slice status is then provided to the scheduler 630. At the same time, pod manager 150 generates a corrective action 623 to repair the detected link problem. The corrective action 623 can then be communicated to a technician 640. If no problem is detected 612, the pod manager updates the scheduler 630 based on the provided slice availability information 610 and present processing may continue.

Figure 7:
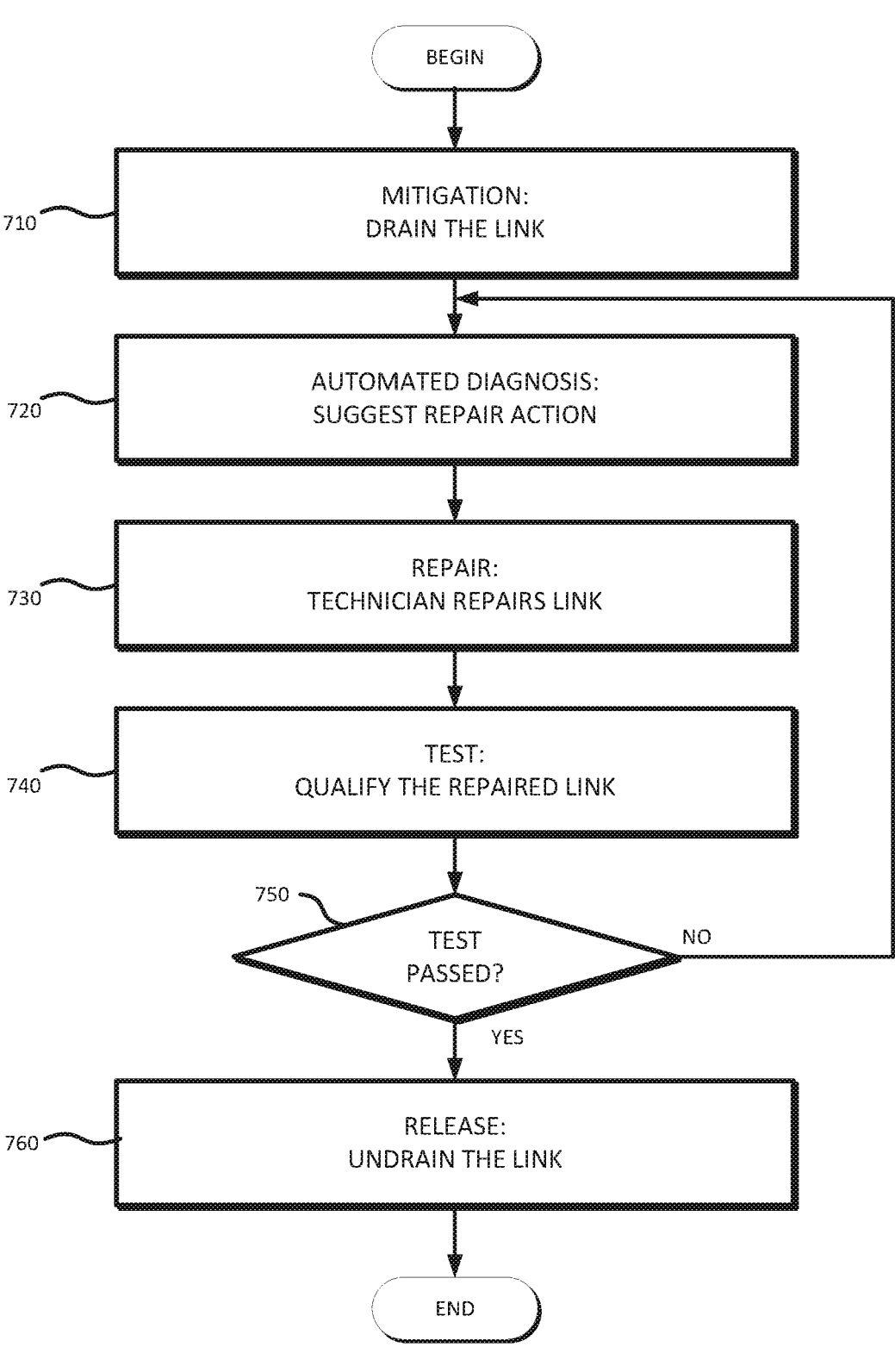
FIG. 7 is a process flow diagram for drainless link repair according to aspects of this disclosure.

FIG. 7 is a process flow diagram for a method for performing drainless link repair according to aspects of this disclosure. Upon discovery of a link failure or problem, the effect of the link failure is mitigated by draining the link (block 710). Draining occurs at the most local slice that contains the directly connected accelerator elements affected by the damaged link. The host(s) connected to the damaged link are not drained allowing the unaffected slices and unaffected accelerator elements in the host to continue processing. An automated diagnosis is performed (block 720). Based on the location and nature of the failure, the pod manager may analyze the states of the network to make an assumption regarding the root cause of the problem, and to generate a corrective action to make a repair. The corrective action is communicated to a field technician. The technician physically applies the corrective action to the link (block 730). Once the repair is attempted, the healthd link health monitoring services will report to the pod manager on the updated slice availability. The pod manager can qualify or validate the repair based on the updated slice availability information (block 740). If the test of the repair in block 750 indicates the repair was successful, then the slices that are flagged as unavailable can be released (block 760) and the link is undrained. If the updated slice availability information indicates that the repair attempt was unsuccessful, then the method returns to block 720 and the pod manager will again assess the link failure and generate a new corrective action until the repair is successful.

Figure 8:
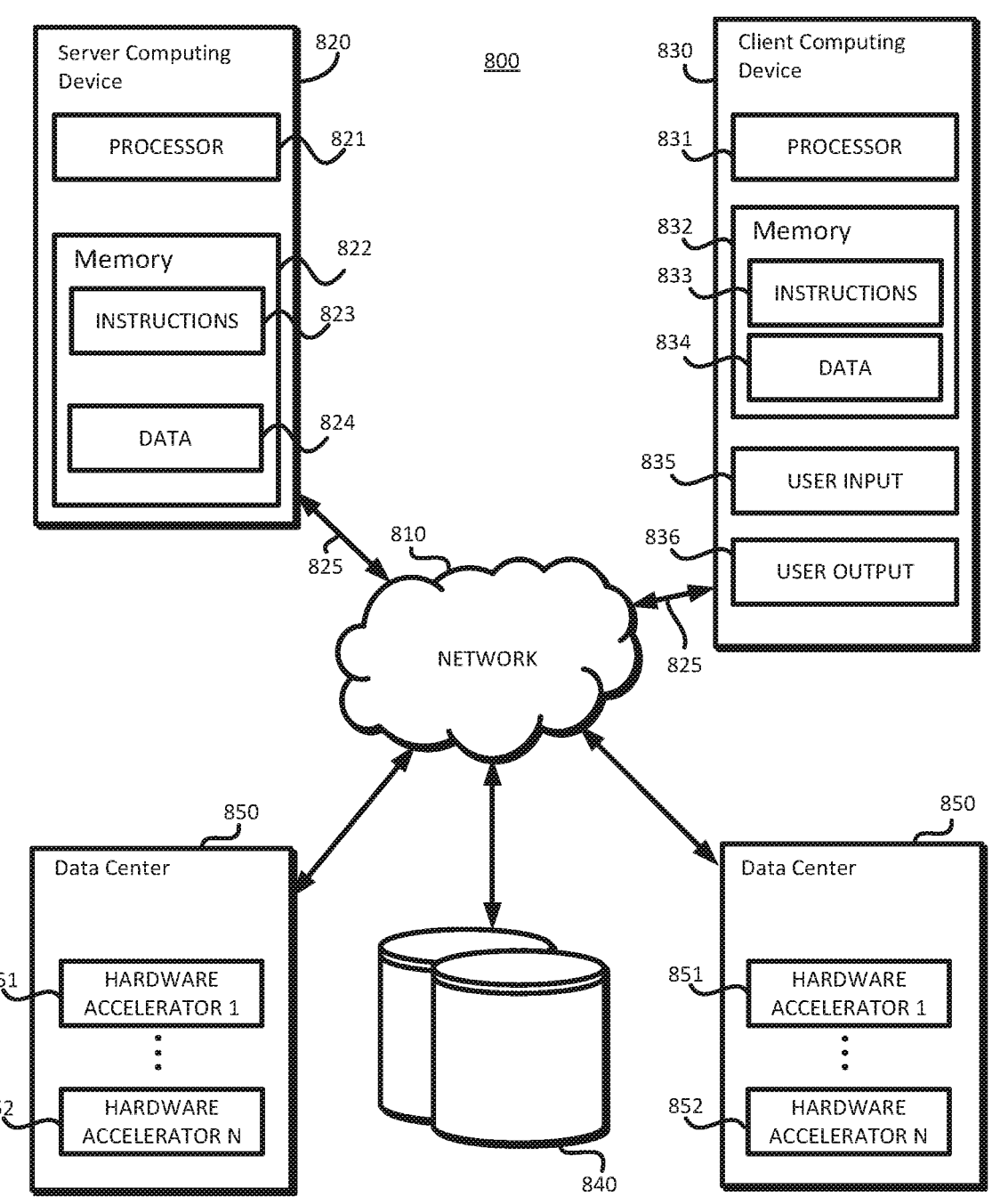
FIG. 8 is a block diagram of a computer-based network for performing drainless link repair according to aspects of this disclosure.

FIG. 8 is a block diagram of a network architecture which may be used to perform drainless link repair according to aspects of this disclosure. Computing devices described herein may include one or more of the computing devices depicted in system 800 of FIG. 8. System 800 includes one or more computing devices 820, 830, storage 840, a network 810 and one or more cloud computing systems 850. Computing devices 820, 830 may include computing devices located at a customer location that makes use of cloud computing services such as Infrastructure as a Service (IaaS), Platform as a Service (PaaS), and/or Software as a Service (SaaS). For example, if a computing device 820, 830 is located at a business enterprise, computing device 820, 830 may use cloud systems 850 as a service that provides software applications (e.g., accounting, word processing, inventory tracking, etc., applications) to computing devices 820, 830 used in operating enterprise systems. In addition, computing device 820, 830 may access cloud computing systems 850 as part of its operations that employ machine learning, or more generally artificial intelligence technology, to train applications that support its business enterprise. For example, computing device 820, 830 may include a client computing device 830 or server computing device 820 in a customer that generates data relating to the customer's business and supplies the data to a cloud platform provider, who then processes that data to process the customer data. Customers may include social media platform providers, government agencies, or any other business that uses machine learning as part of its operations.

As shown in FIG. 8, each of the computing devices 820, 830 may include one or more processors 821, 831, memory 822, 832 storing data 824, 834 and instructions 823, 833, and can provide a user input 835 and output 836. The processors 821, 831 and memories 822, 832 may be communicatively coupled as shown in FIG. 8 and include hosts, accelerator components, and high-speed interconnects as described above. Computing device 820, 830 may also be coupled or connected to storage 840, which may be local or remote storage, e.g., on a Storage Area Network (SAN), that stores data accumulated as part of a customer's operation. Computing device 820, 830 may include a standalone computer (e.g., desktop or laptop) or a server associated with a customer. A given customer may also implement as part of its business multiple computing devices 820 as servers.

Memory 822, 832 stores information accessible by the one or more processors 821, 831, including instructions 823, 833 and data 824, 834 that may be executed or otherwise used by the processor(s) 821, 831. The memory 822, 832 may be of any type capable of storing information accessible by the processor, including a computing device-readable medium, or other medium that stores data that may be read with the aid of an electronic device, such as a hard drive, memory card, ROM, RAM, DVD, or other optical disks, as well as other write-capable and read-only memories. Systems and methods may include different combinations of the foregoing, whereby different portions of the instructions and data are stored on different types of media.

The instructions 823, 833 may be any set of instructions to be executed directly (such as machine code) or indirectly (such as scripts) by the processor 821, 831. For example, the instructions may be stored as computing device code on the computing device-readable medium. In that regard, the terms "instructions" and "programs" may be used interchangeably herein. The instructions may be stored in object code format for direct processing by the processor, or in any other computing device language, including scripts or collections of independent source code modules that are interpreted on demand or compiled in advance. Processes, functions, methods, and routines of the instructions are explained in more detail below.

The data 824, 834 may be retrieved, stored, or modified by processor 821, 831 in accordance with the instructions 823, 833. As an example, data 824, 834 associated with memory 822, 832 may include data used in supporting services for one or more client devices, applications, etc. Such data may include data to support hosting web-based applications, file share services, communication services, gaming, sharing video or audio files, or any other network-based services.

The one or more processors 821, 831 may be any conventional processor, such as commercially available CPUs. Alternatively, the one or more processors may be a dedicated device such as an ASIC, e.g., a tensor processing unit (TPU), or other hardware-based processor. The processor, memory, and other elements of computing device 820, 830 may be arranged within a single block, but it will be understood the one of ordinary skill in the art that the processor, computing device, or memory may actually include multiple processors, computing devices, or memories that may or may not be located or stored within the same physical housing. In one example, one or more computing devices 820, 830 may include one or more server computing devices 820 having a plurality of computing devices (e.g., a load-balanced server farm) that exchange information with different nodes of a network for the purpose of receiving, processing and transmitting the data to and from other computing devices as part of the customer's business operation.

Computing device 820, 830 may also include a display (e.g., a monitor having a screen, a touchscreen, a projector, a television, or other device that is operable to display information) that provides a user interface that allows for controlling the computing device 820, 830. Such control may include, for example, using a computing device to cause data to be uploaded through input 835 to cloud system 850 for processing, causing accumulation of data on storage 840 or more generally, managing different aspects of a customer's computing system. While input 835 may be used to upload data, e.g., a USB port, computing system 800 may also include a mouse, keyboard, touchscreen, or microphone that can be used to receive commands and/or data.

The network 810 may include various configurations and protocols including short range communication protocols such as Bluetooth™, Bluetooth™ LE, the Internet, World Wide Web, intranets, virtual private networks, wide area networks, local networks, private networks using communication protocols proprietary to one or more companies, Ethernet, WiFi, HTTP, etc., and various combinations of the foregoing. Such communication may be facilitated by any device capable of transmitting data to and from other computing devices, such as modems and wireless interfaces. Computing device 820, 830 interfaces with network 810 through communication interface 825, which may include the hardware, drivers, and software necessary to support a given communication protocol.

Cloud computing system 800 may include one or more data centers 850 that may be linked via high-speed communications or computing networks. A given data center 850 within system 800 may include dedicated space within a building that houses computing systems and their associated components, e.g., storage systems and communications systems. Typically, a data center will include racks of communications equipment, server/hosts, and disks. The servers/hosts and disks may be physical computing resources that are used to provide virtual computing resources such as VMs. Data centers 850 may further provide hardware accelerators 851, 852 for providing processing capabilities including but not limited to processing for machine learning and other artificial intelligence processing. To the extent that a given cloud computing system 800 includes more than one data center 850, those data centers 850 may be at different geographic locations within relatively close proximity to each other, chosen to deliver services in a timely and economically efficient manner, as well as provide redundancy and maintain high availability. Similarly, different cloud computing systems are typically provided at different geographic locations.

As shown in FIG. 8, computing system 800 may be illustrated as comprising infrastructure, storage 840, and computing devices 820, 830. Infrastructure, storage 840, and computing devices 820, 830 may in communications with a data center 850 within a cloud computing system 800. Infrastructure may include server computing devices 820, switches, physical links (e.g., fiber) and other equipment used to interconnect server computing devices 820 within a data center 850 with storage 840. A server computing device 820 acts as supervisor or managing agent for jobs being processed by a given data center. In general, server computing device 820 will contain the instructions necessary to, for example, manage the operations requested as port of a synchronous training operation on customer data. server computing device 820 may receive jobs, for example, as a result of input received via an application programming interface (API) from a customer.

The technology described herein increases accelerator hardware resource utilization during link repair, realizing enormous benefits to cloud service providers. Using several building blocks, the described technology forms a complex but accurate end-to-end system. First, real-time link problem detection and isolation allows faulty links to be detected and isolated from machine learning (ML) job scheduling in nearly real-time to minimize user impact. Second, with drainless link repair a link is repaired drainlessly if connected hosts are still online to serve user traffic during link repair. This is achieved by a novel design on accelerator firmware to support hotplug, along with a highly automated repair workflow to perform link repair efficiently at scale.

Real-time link problem detection and isolation is achieved through a health monitoring daemon (healthd) on each host that detects link problems before the user job starts as "preflight check" and further continuously monitors during job runtime. When a problem is detected, healthd reports the problem to the pod manager. Pod manager computes the affected slices and reports the slice status to the scheduler to evict the running job (if there is any) and stop new jobs from landing on these slices. Accordingly, a detected fault link can be isolated in the order of seconds.

In the pod manager, a lowest common ancestor (LCA) algorithm is implemented to find affected slices among static slices. Beginning from each endpoint of the link, the algorithm traverses up the slice hierarchy tree until the first slice that contains both endpoints, then mark it as unavailable. A parent slice is deemed unavailable if any of the children slices is also unavailable.

A detected faulty link will automatically trigger a repair workflow. The term "link drain" is a logical concept used to inform the pod manager to disable the link from transmitting further user traffic. Once the link is drained, an automated diagnosis system will instruct the repair actions based on information informing the collected problems. The automated diagnosis system then dispatches service personnel to the corresponding site for technicians to repair the link. The repair process is the only human involved action in the whole workflow. Depending on the problem and link media type, a link is typically repaired by reseating or swapping the module or cable.

Hot plug support on accelerator firmware enables the repair process to proceed without requiring rebooting the host machine. Therefore, the repair will not interrupt other running jobs that do not require the link under repair.

Following repair, a series of tests will be launched to qualify the repaired link. The qualification algorithm is consistent with an existing preflight check and runtime monitoring through healthd. The tests should be non-disruptive and not interfere with running jobs. If the tests are passed, the workflow informs the pod manager to undrain the link, which reenables the slices. Alternatively, if the tests fail, the process will return back to the beginning of the workflow and start the next round of repair, typically resulting in a more aggressive repair action, until the tests are passed.

To support drainless link repair implementation support for hotplug on an accelerator identifies a hot plug event when an octal small form factor pluggable (OSFP) module is plugged in or taken out during a drainless workflow. The insertion or removal occurs while the machine is on and serving. To allow for the firmware to respond to an OSFP hot plug event in a raceless and non-harmful manner, an algorithm is implemented that captures all hot plug events and responds in a timely manner. All the proper actions are performed to place the firmware in the same state as if had been initialized with the new OSFP module states in place.

To identify a hot plug event, the state of the presence pin of the OSFP module is monitored through the ISA backplane. The the general-purpose input/output (GPIO) raises a level-triggered interrupt when one of its expander input pins (including the presence pin) for an OSFP module, changes state. This interrupt line is read in by the GPIO, which can be directly read from firmware. The pin states of backplane itself can be read directly from firmware via the GPIO pins. The algorithm followed by firmware to monitor hot plug events is as follows:

At $T_0$, the initial states of the modules are saved.

At $T_1$, when a hot plug event occurs, such as a module being unplugged or inserted, a presence pin changes its state, and an interrupt is asserted. The interrupt at the module firmware is temporarily blocked.

At $T_2$, the interrupt calls a hot plug callback function, which wakes up a link monitor.

At $T_3$, the link monitor is awoken. The link monitor performs the following actions:

1. a task semaphore is set so that the link monitor only runs once.

2. A hot plug flag is reset to false, if true to re-initialize the hot plug presence pin.

3. The hot plug presence pin states are read and notes any changed from the last check.

4. The interrupt at the module firmware is unmasked.

5. The pin states are re-read and any new state changes are noted.

6. Modules determined to require resetting are perform initialization.

7. Finally, the module LED and PCS statuses are updated.

Although the subject matter has been described with reference to particular examples, it is to be understood that these examples are merely illustrative of the principles and applications of the subject matter set forth in the claims. It is therefore to be understood that numerous modifications may be made and that other arrangements may be devised without departing from the spirit and scope of the subject matter as defined by the appended claims.

The invention claimed is:

1. A system for repair of an accelerator architecture comprising:
a plurality of accelerator hosts;
a plurality of accelerator elements in each host;
a plurality of high-speed interconnects between accelerator elements;
a processor of each host executing a link health monitor service in each host configured to determine a status of each interconnect associated with the host and communicate the link status of each interconnect;
a pod manager for dividing the plurality of accelerator elements in the plurality of hosts into a plurality of slices comprising a number of the plurality of accelerator elements, the pod manager organizing the plurality of slices into a hierarchical tree structure, wherein the pod manager receives the communicated link status of each interconnect, and identifies one or more slices in direct connection with an interconnect with a failure status; and
a scheduler in communication with the pod manager, the scheduler configured to schedule accelerator tasks to other slices than the one or more identified slices in direct connection with the interconnect having the failure status.

2. The system of claim 1, the plurality of high-speed interconnects comprising:
at least one internal interconnect between a first accelerator element and a second accelerator element within a same accelerator host; and
at least one external interconnect between an accelerator element in a first accelerator host, and another accelerator element in a second accelerator host.

3. The system of claim 2, the link health monitor service configured to detect link status of the at least one internal interconnect and the at least one external interconnect associated with a given accelerator host.

4. The system of claim 1,
wherein the scheduler configured to receive user job requests and map the received user request to a slice of the accelerator architecture for execution of the user request.

5. The system of claim 4, the pod manager communicatively connected between the scheduler and each accelerator host.

6. The system of claim 5, the pod manager configured to:
responsive to a message indicating a failure in an interconnect from one or more link health monitor service, determining a least common ancestor of the hierarchical tree of slices of the accelerator architecture, the least common ancestor defining a slice containing a first accelerator element and a second accelerator unit connected by the failed interconnect; and
flagging the least common ancestor and all parent slices of the least common ancestor in the hierarchical tree of slices.

7. The system of claim 6, the pod manager further configured to:
communicating all flagged slices to the scheduler to be drained by the scheduler.

8. The system of claim 6, the pod manager further configured to:
automatically determine a corrective action to repair the failed interconnect; and
communicate the determined corrective action to a technician.

9. The system of claim 8, the pod manager further configured to:
validate a repair performed by the technician; and
reactivate slices associated with the repaired interconnect.

10. The system of claim 9, wherein if validation indicates the repair was unsuccessful, the pod manager configured to automatically re-determine a second corrective action to repair the failed interconnect.

11. The system of claim 7, the scheduler configured to:
identify any uncompleted tasks assigned to a flagged slice; and
reschedule the uncompleted tasks to a remaining active slice.

12. The system of claim 1, each accelerator host comprising:
a compute processor; and
a firmware memory in communication with the compute processor, the firmware memory storing instructions that when executed by the compute processor, cause the compute processor to allow the accelerator host to continue running when an interconnect is removed or plugged into the accelerator host.

13. A method for troubleshooting an accelerator architecture comprising a plurality of accelerator hosts, the method comprising:
automatically detecting a failure in an interconnect connecting two accelerator elements in the accelerator architecture in a health monitor service executed by a processor in each of the plurality of accelerator hosts;
in the link health monitor service, identifying a first accelerator element and a second accelerator element connected by the failed interconnect; and
identifying in a pod manager, a slice of accelerator elements, the slice including both the first accelerator element and the second accelerator element, the slice being organized in a hierarchical tree, and disabling accelerator elements in the slice of accelerator elements and all parent nodes of the identified slice of accelerator elements; and in a scheduler, sending accelerator tasks to an accelerator element in a different slice than the slice including both the first and second accelerator elements.

14. The method of claim 13, further comprising:

marking, by the pod manager the identified slice as inactive; and preventing scheduling of any processing task on the marked slice.

15. The method of claim 14, further comprising:

in the pod manager, automatically identifying a corrective action for the failed interconnect; and communicating the corrective action to a technician.

16. The method of claim 15, further comprising:

upon completion of the corrective action, in the pod manager, validating a repair of the failed interconnect; and on a condition that repair was successful, reactivating the inactive slice associated with the failed interconnect and on a condition that the repair was unsuccessful, identifying a second corrective action.

17. The method of claim 16, further comprising:

in the pod manager, notifying the scheduler of an updated status of the affected slice.

18. The method of claim 17, further comprising:

after identifying a slice of accelerator elements, the slice including both the first accelerator element and the second accelerator element, the slice being organized in a hierarchical tree, further identifying all parent slices containing the identified slice of accelerator elements in the hierarchical tree, and marking the parent slices as inactive.

19. A non-transitory computer readable medium storing instructions executable by a computer processor, that when executed by the computer processor, cause the computer processor to:

in an accelerator architecture comprising a plurality of accelerator components connected to each other through high-speed interconnects, detecting a failure of at least one of the interconnects;

communicating the detected failure of the interconnect to a pod manager;

in the pod manager, determining a slice defining a group of connected accelerator components containing a first accelerator component and a second accelerator component connected by the failed interconnect, the slices arranged in a hierarchical tree;

marking the determined slice and all parent slices of the determined slice in the hierarchical tree as affected by the failed interconnect; and identifying a scheduler of the affected slices, wherein the scheduler does not schedule any processing tasks to the affected slices.

* * * * *